(12) United States Patent
Choi

(10) Patent No.: US 11,310,358 B2
(45) Date of Patent: Apr. 19, 2022

(54) SMART PHONE CASE COMBINATION KEYBOARD FOR BLIND

(71) Applicant: Tai Hong Choi, Seoul (KR)

(72) Inventor: Tai Hong Choi, Seoul (KR)

( * ) Notice: Subject to any disclaimer, the term of this patent is extended or adjusted under 35 U.S.C. 154(b) by 0 days.

(21) Appl. No.: 17/269,549

(22) PCT Filed: Jul. 26, 2019

(86) PCT No.: PCT/KR2019/009304
§ 371 (c)(1),
(2) Date: Feb. 19, 2021

(87) PCT Pub. No.: WO2020/045832
PCT Pub. Date: Mar. 5, 2020

(65) Prior Publication Data
US 2021/0360101 A1    Nov. 18, 2021

(30) Foreign Application Priority Data

Aug. 29, 2018 (KR) .......................... 10-2018-0102169

(51) Int. Cl.
*H04M 1/72481* (2021.01)
*H04M 1/72412* (2021.01)
(Continued)

(52) U.S. Cl.
CPC ......... *H04M 1/72481* (2021.01); *A45C 11/00* (2013.01); *A45C 15/00* (2013.01);
(Continued)

(58) Field of Classification Search
CPC ........... H04M 1/72481; H04M 1/0266; H04M 1/236; H04M 1/72466; H04M 1/72412;
(Continued)

(56) References Cited

U.S. PATENT DOCUMENTS

| | | | |
|---|---|---|---|
| 6,084,576 A * | 7/2000 | Leu ........................ | G06F 3/0219 341/22 |
| 6,184,804 B1 * | 2/2001 | Harrison ................. | G06F 1/163 341/20 |

(Continued)

FOREIGN PATENT DOCUMENTS

| | | |
|---|---|---|
| JP | 2008-544396 | 12/2008 |
| JP | 4450008 | 4/2010 |

(Continued)

*Primary Examiner* — Lewis G West
(74) *Attorney, Agent, or Firm* — Lex IP Meister, PLLC

(57) ABSTRACT

The present invention relates to a smart phone case combination keyboard for the blind that includes: a cover main body having a mounting space to which a smart phone is mounted so as to expose a display unit on an upper surface, a plurality of lower key holes formed toward downward on a lower surface, and a front key hole respectively formed on a left and right of a surface toward frontward; a keyboard cover embedded in the main body, having a plurality of keys respectively protruded through the lower key holes and operated by a thumb of a hand gripping the cover main body as a first front key and a second front key are protruded through each of the front key holes; a communication module performing communication between the smart phone and the keyboard; and a controller that controls to perform pairing with the smart phone through the communication module and to transmit a key input signal of the keyboard to the smart phone through the communication by the communication module. According to the present invention, the smart phone may be stably gripped and the stable typing enable due to the keyboard arrangement on the lower surface while protecting the smart phone from external impact, and it is possible to provide the call mode along with the keyboard arrangement to enable the convenient use of the blind and improve the speed and accuracy of the typing through the use of the thumb that is not normally used for the (Continued)

typing, the unwanted separation may be prevented by the comfortable and stable gripping.

3 Claims, 7 Drawing Sheets

(51) Int. Cl.
  *H04M 1/72466*  (2021.01)
  *A45C 11/00*  (2006.01)
  *A45C 15/00*  (2006.01)
  *G06F 3/02*  (2006.01)
  *G06F 3/023*  (2006.01)
  *H04M 1/02*  (2006.01)
  *H04M 1/23*  (2006.01)

(52) U.S. Cl.
  CPC .......... *G06F 3/0219* (2013.01); *G06F 3/0231* (2013.01); *H04M 1/0266* (2013.01); *H04M 1/236* (2013.01); *H04M 1/72412* (2021.01); *H04M 1/72466* (2021.01); *A45C 2011/002* (2013.01)

(58) Field of Classification Search
  CPC ..... G06F 3/0231; G06F 3/0219; A45C 11/00; A45C 15/00; A45C 2011/002
  See application file for complete search history.

(56) References Cited

U.S. PATENT DOCUMENTS

| | | | | |
|---|---|---|---|---|
| 6,639,510 B1 * | 10/2003 | Soulie | ................... | G06F 3/0219 340/407.1 |
| 7,029,190 B1 * | 4/2006 | Davis | ................... | G06F 3/0219 341/21 |
| 8,245,158 B1 * | 8/2012 | Schrick | ............... | G06F 3/04895 715/864 |
| 9,092,066 B1 | 7/2015 | Plager | | |
| 9,768,818 B2 | 9/2017 | Wong Chee | | |
| 10,667,587 B1 * | 6/2020 | Shannon, III | ........ | G03B 11/045 |
| 2002/0118175 A1 * | 8/2002 | Liebenow | ............. | G06F 3/0236 345/168 |
| 2003/0026637 A1 * | 2/2003 | Fu | ......................... | G06F 3/0221 400/472 |
| 2003/0030625 A1 * | 2/2003 | Kauk | .................... | G06F 3/0219 345/169 |
| 2004/0081312 A1 * | 4/2004 | Salpietra | ........... | H04M 1/72436 379/368 |
| 2007/0286663 A1 * | 12/2007 | Kinney | .................. | G06F 1/1616 400/489 |
| 2011/0210025 A1 * | 9/2011 | Miles | ................... | H04B 1/3888 206/320 |
| 2011/0215954 A1 * | 9/2011 | Page | ..................... | G06F 3/0235 341/22 |
| 2012/0075125 A1 * | 3/2012 | Miwa | .................... | G06F 1/1669 341/22 |
| 2014/0262847 A1 * | 9/2014 | Yang | ..................... | F16M 11/14 206/37 |
| 2019/0357647 A1 * | 11/2019 | Kilmer | ............... | H05K 7/20409 |
| 2020/0081551 A1 * | 3/2020 | Giragossian | .......... | G06F 1/1626 |

FOREIGN PATENT DOCUMENTS

| | | |
|---|---|---|
| KR | 10-1145537 | 5/2012 |
| KR | 2012-0064739 | 6/2012 |
| KR | 2014-0090347 | 7/2014 |
| KR | 10-1458708 | 11/2014 |
| KR | 1611866 | 4/2016 |
| KR | 10-1983504 | 5/2019 |

* cited by examiner

SMART PHONE CASE COMBINATION KEYBOARD FOR BLIND

TECHNICAL FIELD

The present invention relates to a smart phone case combination keyboard for the blind. More particularly, the present invention relates to a smart phone case combination keyboard for the blind, which enables convenient use of not only the blind but also the general public while protecting the smart phone from external impact and enables accurate and quick typing.

BACKGROUND ART

In general, with the development of information communication technology, the use of smart phones has become common, and recently, the smart phone has had a generalized method of inputting information through a screen touch method. However, this screen touch method has a problem with a high frequency of typographical errors due to a limited screen size. In addition, in the case of the blind, the input of the screen touch method causes a great inconvenience.

Therefore, in order to ameliorate this problem, a technology for implementing a keyboard on a smart phone is being developed, and as a related art, Korean Patent Publication No. 10-2015-0036927 "Wireless keyboard for smart phone" has been presented. This consists of: a keyboard module including a general-purpose keyboard input unit for inputting Hangul, English, and numbers on the surface of the case and a special function input unit for a smart phone for key input to perform special functions of the smart phone; a wireless communication module that performs wireless communication with the smart phone to transmit key input information input through the keyboard module to the smart phone; a control module that generates key input information according to the key input of the keyboard module to be output to the wireless communication module; and a power supplying module that supplies driving power of the keyboard module and a control module.

However, in the conventional art, it is still inconvenient to type on the keyboard while holding a relatively small sized smart phone due to the structure in which the keyboard faces upward, and in addition to this, it causes great inconvenience to the blind.

In addition, the conventional art has a problem that it has limitations in improving speed and accuracy of the typing because it does not require the use of all fingers, particularly the thumb.

DISCLOSURE

Technical Problem

In order to solve the problems of the conventional art as described above, the present invention enables stable gripping of the smart phone due to the keyboard arrangement on the lower surface and enables stable typing while protecting the smart phone from external impact, to provide a call mode along with a keyboard arrangement that enables convenient use for the blind, to improve speed and accuracy of typing through the use of the thumb, which is not normally used for typing, and to prevent unwanted dropping by comfortable and stable gripping.

Other objects of the present invention are easily understood through a description of following embodiments.

Technical Solution

In order to achieve the above object, according to one aspect of the present invention, a smart phone case combination keyboard for the blind including: a cover main body having a mounting space to which a smart phone is mounted so as to expose a display unit on an upper surface, a plurality of lower key holes formed toward downward on a lower surface and a front key hole respectively formed on a left and right of a surface toward frontward; a keyboard cover embedded in the main body, having a plurality of keys respectively protruded through the lower key holes and operated by a thumb of a hand gripping the cover main body as a first front key and a second front key protruded through each of the front key holes; a communication module performing communication between the smart phone and the keyboard; and a controller that controls to perform pairing with the smart phone through the communication module and to transmit a key input signal of the keyboard to the smart phone through the communication by the communication module, is provided.

In the keyboard, the first front key and the second front key may be disposed at a right angle at the end of the surface where the keys are arranged in multiple.

A mode switch of a slide switch type installed to expose and be protruded to the lower switch hole formed to face downward on the lower surface of the cover main body and provided to select a locking mode, an input mode and a dial mode respectively may be further included, the controller may control to block a key input through the keyboard when the locked mode is selected by the mode switch, control to allow a key input through the keyboard when the input mode is selected by the mode switch, and when the dial mode is selected by a mode switch, control to convert some of the keys in the keyboard to a phone key required for phone use.

A deformed grip unit respectively attached to both sides of the cover main body to be positioned between the cover main body and a gripping hand and made of a material with a shape that is changed by an external force may be further included.

In the deformed grip unit, a thickness-reduced part formed so as to gradually reduce the thickness at both ends may be attached to surround both edges of the cover main body, and a protruded supporting part may be formed to be protruded from the thickness-reduced part at positions close to the first front key and the second front key and inserted between a gripping thumb and an index finger.

Advantageous Effects

According to the smart phone case combination keyboard for the blind of the present invention, the smart phone may be stably gripped and the stable typing may be enabled due to the keyboard arrangement on the lower surface while protecting the smart phone from external impact, and it is possible to provide the call mode along with the keyboard arrangement to enable the convenient use of the blind and improve the speed and accuracy of the typing through the use of the thumb that is not normally used for the typing, and the unwanted separation may be prevented by the comfortable and stable gripping.

MODE FOR INVENTION

Figure 1:
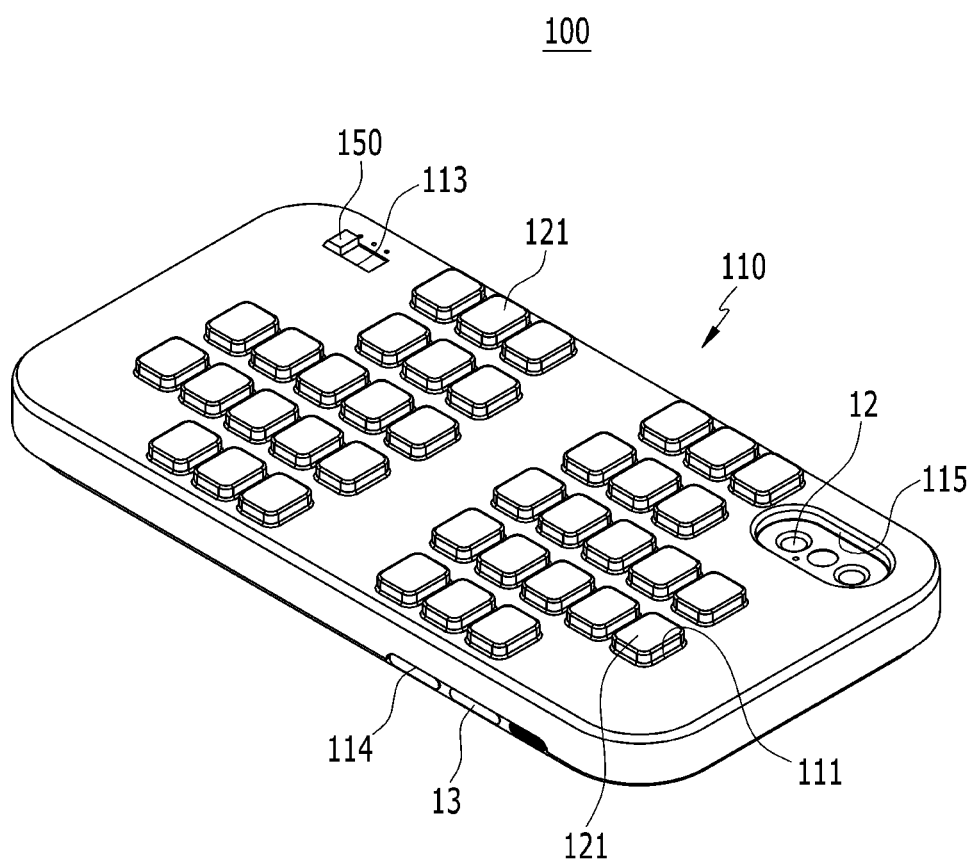
FIG. 1 is a bottom perspective view showing a smart phone case combination keyboard for the blind according to an embodiment of the present invention.

The present invention may be changed in various ways and has various embodiments, so that specific embodiments will be illustrated in accompanying drawings and described in detail. However, this is not intended to limit the present invention to a specific embodiment, and should be understood as including all changes, equivalents, or substitutes included in the technical spirit and technical range of the present invention and may be changed in various other forms, and the range of the present invention is not limited to the following examples.

Hereinafter, embodiments according to the present invention will be described in detail with reference to the accompanying drawings, the same reference numerals are assigned to the same or corresponding constituent elements regardless of the reference numeral, and duplicate descriptions thereof will be omitted.

Figure 2:
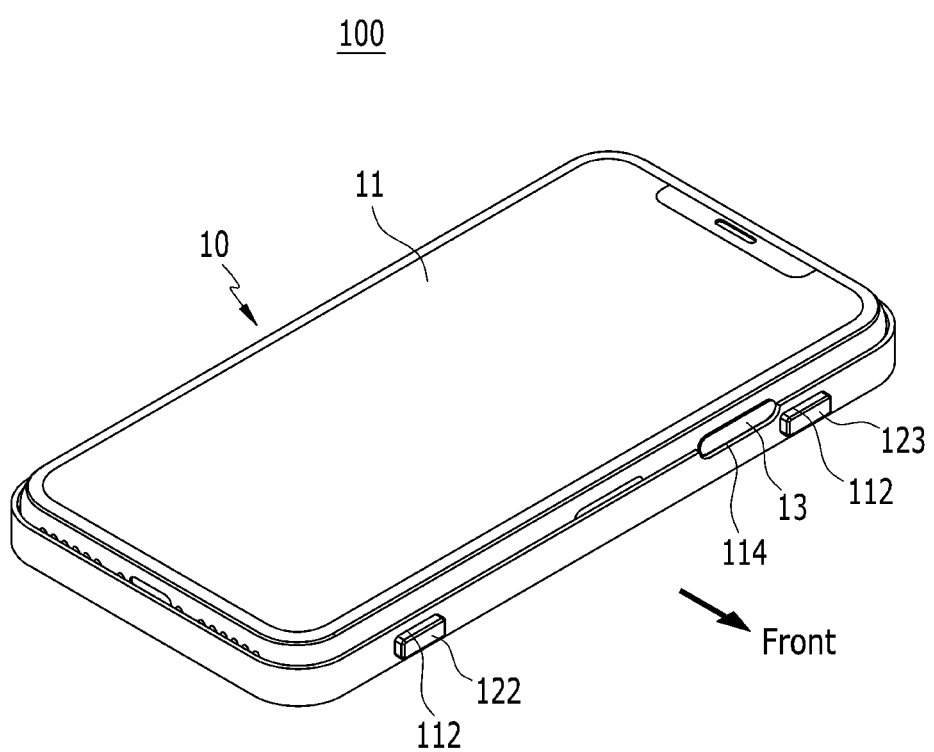
FIG. 2 is a plan perspective view showing a smart phone case combination keyboard for the blind according to an embodiment of the present invention.
Figure 3:
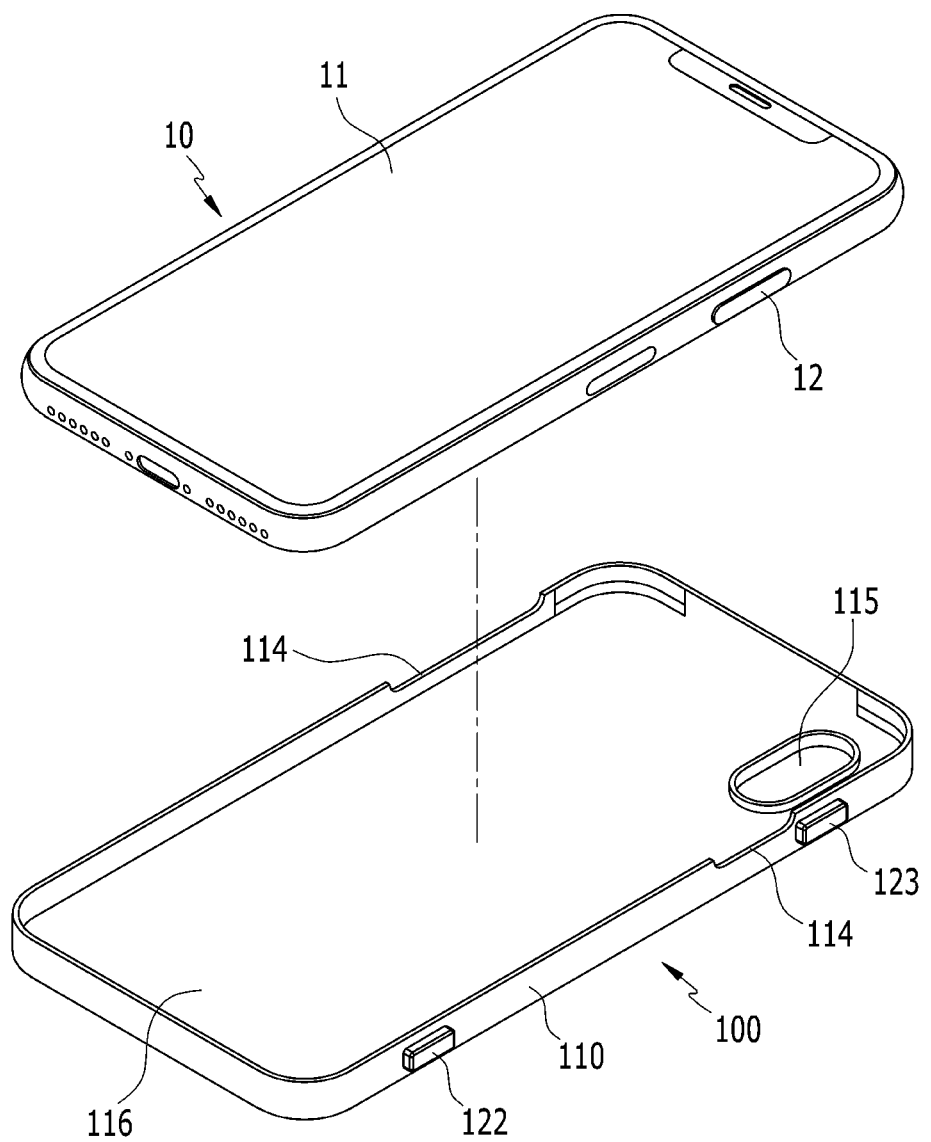
FIG. 3 is a perspective view showing a mounting shape of a smart phone case combination keyboard for the blind according to an embodiment of the present invention.
Figure 4:
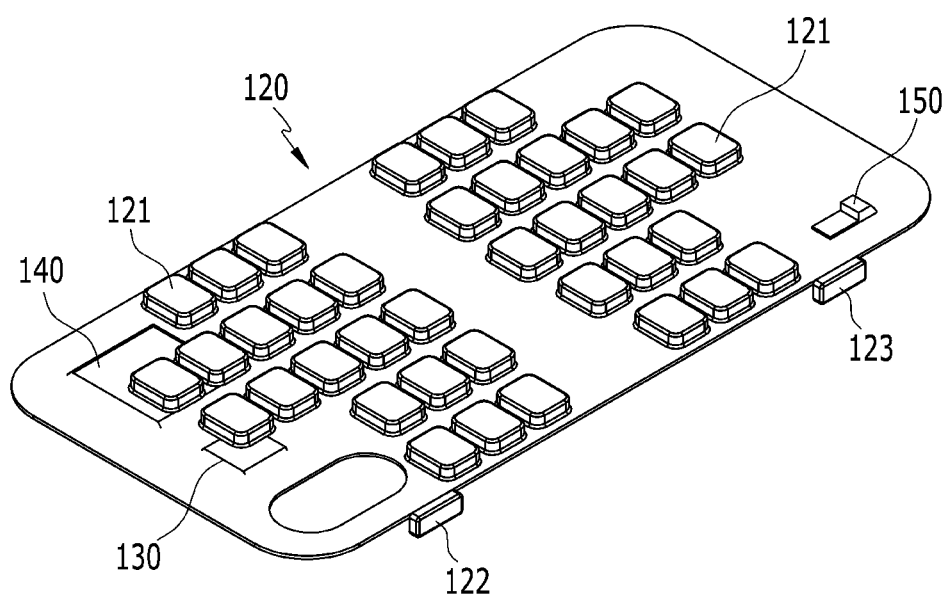
FIG. 4 is a perspective view showing a keyboard of a smart phone case combination keyboard for the blind according to an embodiment of the present invention.

FIG. 1 is a bottom perspective view showing a smart phone case combination keyboard for the blind according to an embodiment of the present invention, FIG. 2 is a plan perspective view showing a smart phone case combination keyboard for the blind according to an embodiment of the present invention, FIG. 3 is a perspective view showing a mounting shape of a smart phone case combination keyboard for the blind according to an embodiment of the present invention, and FIG. 4 is a perspective view showing a keyboard of a smart phone case combination keyboard for the blind according to an embodiment of the present invention.

Referring to FIG. 1 to FIG. 4, a smart phone case combination keyboard 100 for the blind according to an embodiment of the present invention may include a cover main body 110, a keyboard 120, a communication module 130, and a controller 140.

In the cover main body 110, a mounting space 116 on which the smart phone 10 is mounted so as to expose the display unit 11 is formed on the upper surface, a plurality of lower key holes 111 are formed on the lower surface to face downward, and a front key hole 112 is respectively formed on the left and right sides of the surface facing forward when typing. Here, the lower key hole 111 is formed to be opened downward from the cover main body 110, and may be formed to correspond to each of the keys 121 arranged in a plurality on one plane in the keyboard 120 to be described later. The front key hole 112 may be formed to correspond to each of the first front key 122 and the second front key 123 provided on the side of the keyboard 120. Meanwhile, the first front key 122 and the second front key 123 may be a space key and a delete key, or a delete key and a space key, respectively. The space key and the delete key, which are frequently used, are provided on the side of the keyboard 120 to be distinguished from the keys arranged on a plane, thereby improving usability.

In the cover main body 110, a lower switch hole 113 for exposure and protrusion of a mode switch 150 to be described later may be formed to face downward on the lower surface, a button groove 114 to expose a button 13 provided on the smart phone 10 may be formed, and a camera hole 115 to expose a camera 12 of the smart phone 10 may be formed on the lower surface.

Figure 6:
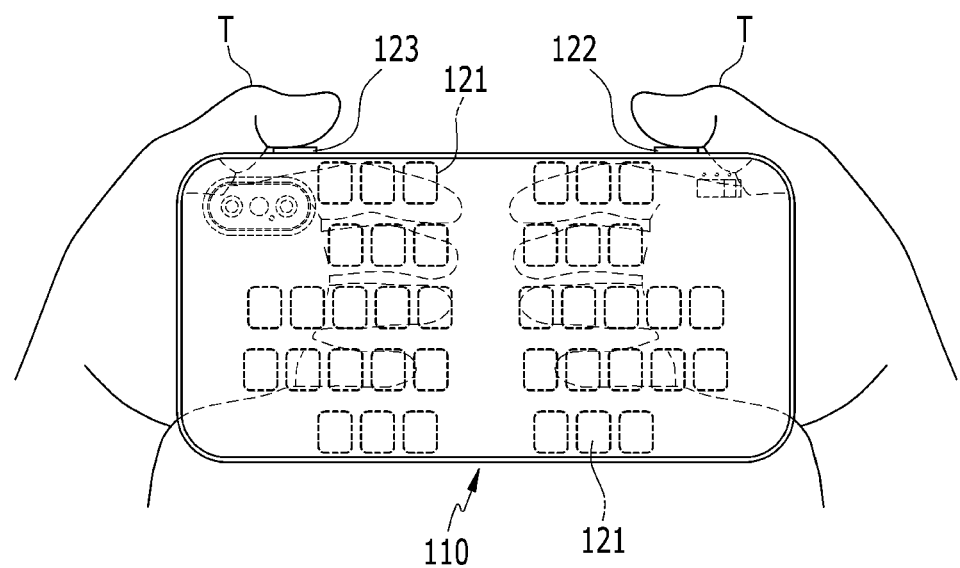
FIG. 6 is a top plan view showing a use shape of a smart phone case combination keyboard for the blind according to an embodiment of the present invention.

The keyboard 120 has a plurality of keys 121 that are embedded in the cover main body 110 and are protruded through each of the lower key holes 111, but the first front key 122 and the second front key 123 are protruded through each of the front key holes 112 so as to be manipulated with a thumb T of a hand holding the cover main body 110 (referring to FIG. 6). Here, the key 121, the first front key 122 and the second front key 123 may be keys that enable a user to input a corresponding signal by pressing the keyboard 120. The keyboard 120 is embed in the cover main body 110, so it may be wrapped in the state in which the key 121 is exposed by the cover main body 110 of a synthetic resin material, and for this purpose, the cover main body 110 may be formed by applying a known molding method.

The keys 121 of the keyboard 120 may be composed as, for example, a qwerty keyboard, but are not limited thereto and may be composed as various types of keyboards, but the first front key 122 and the second front key 123 in the composed type of keyboards may be disposed in the front key hole 112 as described above.

The keyboard 120 may dispose the first front key 122 and the second front key 123 to be at a right angle to the end of the surface where a plurality of keys 121 are arranged (referring to FIG. 4). Therefore, a three-dimensional arrangement of the first front key 122 and the second front key 123 for the keyboard 120 of a plate-shaped structure is facilitated.

The communication module 130 performs communication between the smart phone 10 and the keyboard 120. According to one aspect, the communication module 130 may be provided on the keyboard 120, thereby making it easy to install in the cover main body 110 and to enable formation of a compact structure. Meanwhile, the communication module 130 may be a wired communication module or a short-range wireless communication module, and preferably may be a Bluetooth module.

The controller 140 may control to perform pairing with the smart phone 10 through the communication module 130 and also control the key input signal of the keyboard 120 to be transmitted to the smart phone 10 through the communication by the communication module 130, preferably the Bluetooth communication, and in addition, it is possible to perform various controls necessary for an operation such as by the keyboard 120.

The smart phone case combination keyboard 100 for the blind according to an embodiment of the present invention may further include a mode switch 150 installed to be protruded or exposed to the lower switch hole 113 formed at the lower surface of the cover main body 110 and being a slide switch type to respectively select a lock mode, an input mode, and a dial mode. In this mode switch 150, a slide switch that is capable of a three-step operation may be used so that the blind may intuitively select each of three modes accurately. When the lock mode is selected by the mode switch 150, the controller 140 may receive it as a signal and control to block the key input through the keyboard 120, when the input mode is selected by the mode switch 150, the controller 140 may receive it as a signal and control to allow the key input through the keyboard 120, and when the dial mode is selected by the mode switch 150, the controller 140 may receive it as a signal and control to switch some of the keys 121 from the keyboard 120 to a phone key 124 required for phone use.

Figure 5:
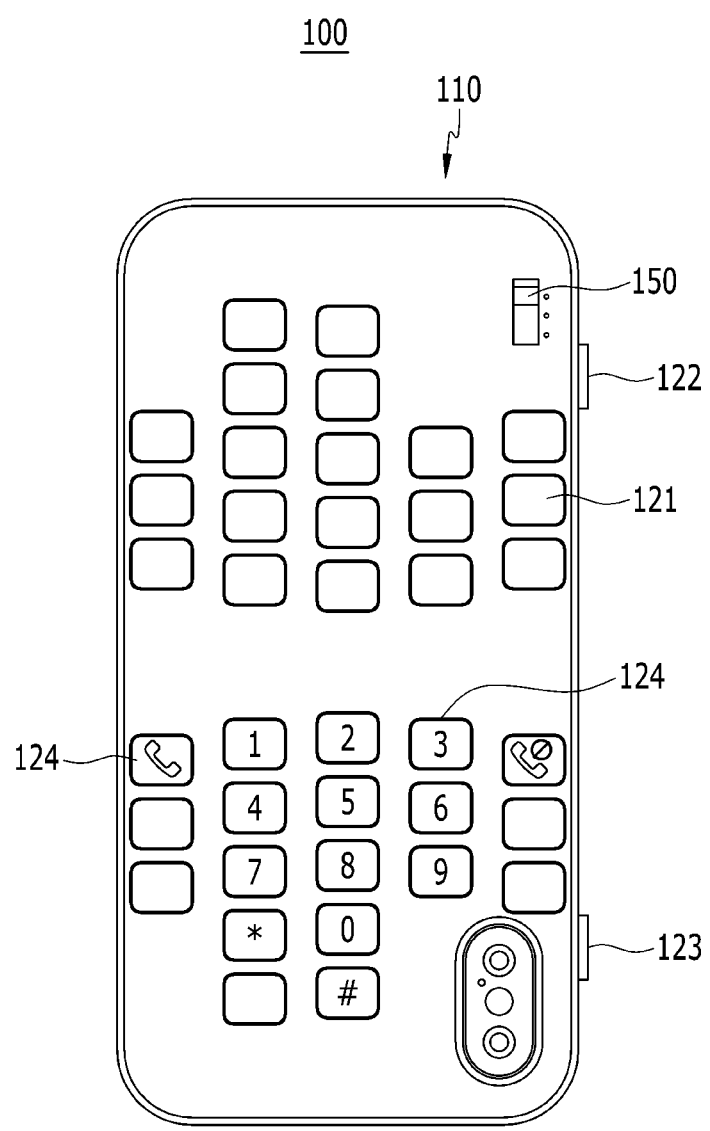
FIG. 5 is a bottom view showing a call mode of a smart phone case combination keyboard for the blind according to an embodiment of the present invention.

Referring to FIG. 5, the keyboard 120 enables the signal input such as answering calls, hanging up, numbers 0-9, *, #, etc. when they are necessary for sending/receiving calls, and when being switched to the phone key 124 among the keys 121, indications corresponding to each of these signals may be provided. In addition, the phone key 124 may have the same or similar arrangement to an existing phone keyboard.

Figure 7:
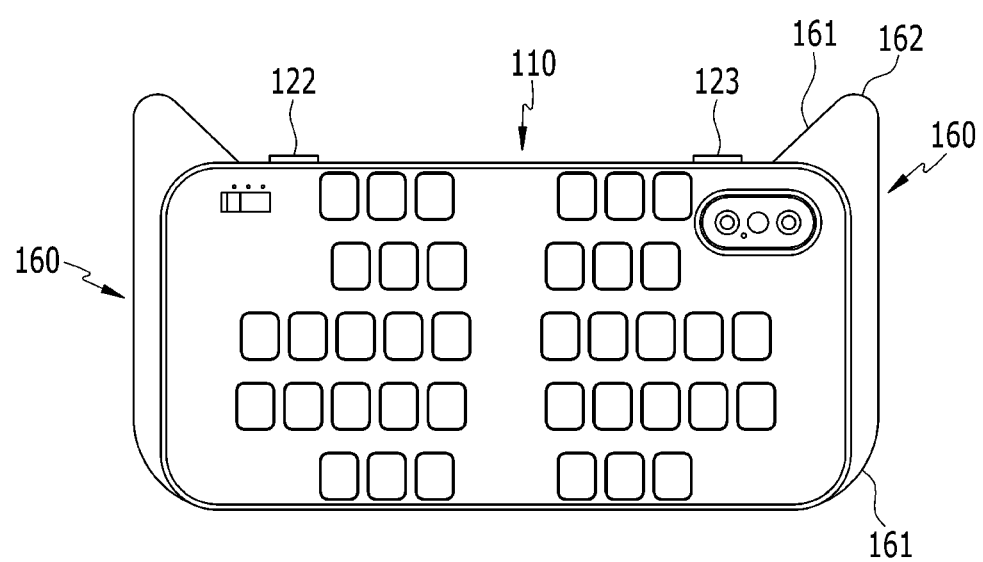
FIG. 7 is a bottom view showing a smart phone case combination keyboard for the blind according to another embodiment of the present invention.

Referring to FIG. 7, the smart phone case combination keyboard 100 for the blind according to an embodiment of the present invention may further include a deformed grip unit 160 that is respectively attached to both sides of the cover main body 110 to be disposed between the cover main body 110 and the holding hand and made of a material of which a shape is changed by an external force. The deformed grip unit 160 is made of a material whose shape changes by external force so as to maintain the shape corresponding to the shape of the user's hand, and not only does it provide excellent holding comfort, but also ensures stable fixation, and for this purpose, it may be made of synthetic resin materials that may be deformed, for example including silicon or rubber. In addition, the deformed grip unit 160 may be attached to the cover main body 110 by using an adhesive or a double-sided tape, or may be manufactured to be integrated when the cover main body 110 is manufactured.

In the deformed grip unit 160, a thickness-reduced part 161 of which the thickness is gradually reduced at both ends may be respectively attached to cover both edges of the cover main body 110, and a protruded supporting part 162 that is sandwiched between the gripping thumb and index finger may be formed by being protruded from the thickness-reduced part 161 on the position adjacent to each of the first front key 122 and the second front key 123. Here, the thickness-reduced part 161 may maintain a firmly attached state even if it is bent on the cover main body 110 or attached to the edge with a curvature by reducing the restoring force by the reduction of the thickness in the thickness-reduced part 161. In addition, the protruded supporting part 162 not only helps the gripping hand maintain a comfortable posture, but also prevents unwanted separation despite long use, the gripping by the user with a weak grip, or a strong touch applied to the body from the outside, thereby enabling safe and comfortable use of the smart phone 10.

According to the smart phone case combination keyboard according to the present invention for the blind as described above, the smart phone is stably gripped and the stable typing is enabled due to the keyboard arrangement on the lower surface while protecting the smart phone from external impact.

In addition, according to the present invention, it is possible to provide the call mode along with the keyboard arrangement to enable convenient use by the blind and improve the speed and accuracy of the typing through the use of the thumb that is not normally used for the typing, and the unwanted separation may be prevented by the comfortable and stable gripping.

Above, the present invention has been described with reference to the accompanying drawings, but of course various modifications and variations can be made within a range not departing from the technical idea of the present invention. Therefore, the range of the present invention should not be limited to the described embodiments and should be determined not only by the claims range to be described later, but also by equivalents to the claims range.

The invention claimed is:

1. A smart phone case combination keyboard for the blind, comprising:
   a cover main body having a mounting space to which a smart phone is mounted so as to expose a display unit on an upper surface, a plurality of lower key holes formed toward downward on a lower surface, and a front key hole respectively formed on a left and right of a surface toward frontward;
   a keyboard cover embedded in the main body, having a plurality of keys respectively protruded through the lower key holes and operated by a thumb of a hand gripping the cover main body as a first front key and a second front key are protruded through each of the front key holes;
   a communication module performing communication between the smart phone and the keyboard;
   a controller that controls to perform pairing with the smart phone through the communication module and to transmit a key input signal of the keyboard to the smart phone through the communication by the communication module; and
   a mode switch of a slide switch type installed to expose and be protruded to the lower switch hole formed to face downward on the lower surface of the cover main body and provided to select a locking mode, an input mode, and a dial mode respectively,
   wherein the controller controls to block a key input through the keyboard when the locked mode is selected by the mode switch, controls to allow a key input through the keyboard when the input mode is selected by the mode switch, and when a dial mode is selected by the mode switch, controls to convert some of the keys in the keyboard to phone keys required for phone use.

2. The smart phone case combination keyboard for the blind of claim 1, wherein
   in the keyboard, the first front key and second front key are disposed at a right angle at the end of the surface where the keys are arranged in multiple.

3. A smart phone case combination keyboard for the blind, comprising:
   a cover main body having a mounting space to which a smart phone is mounted so as to expose a display unit on an upper surface, a plurality of lower key holes formed toward downward on a lower surface, and a front key hole respectively formed on a left and right of a surface toward frontward;
   a keyboard cover embedded in the main body, having a plurality of keys respectively protruded through the lower key holes and operated by a thumb of a hand gripping the cover main body as a first front key and a second front key are protruded through each of the front key holes;
   a communication module performing communication between the smart phone and the keyboard;
   a controller that controls to perform pairing with the smart phone through the communication module and to transmit a key input signal of the keyboard to the smart phone through the communication by the communication module; and a deformed grip unit respectively attached to both sides of the cover main body to be positioned between the cover main body and a gripping hand and made of a material of which a shape is changed by an external force wherein in the deformed grip unit, a thickness-reduced part formed so as to gradually reduce the thickness at both ends is attached to surround both edges of the cover main body, and a protruded supporting part is formed to be protruded from the thickness-reduced part at positions close to the first front key and the second front key and inserted between a gripping thumb and an index finger.

\* \* \* \* \*